April 6, 1948.  S. FRANKEL ET AL  2,438,907
CONDENSER DISCHARGE CONTROL CIRCUIT
Filed Nov. 2, 1944
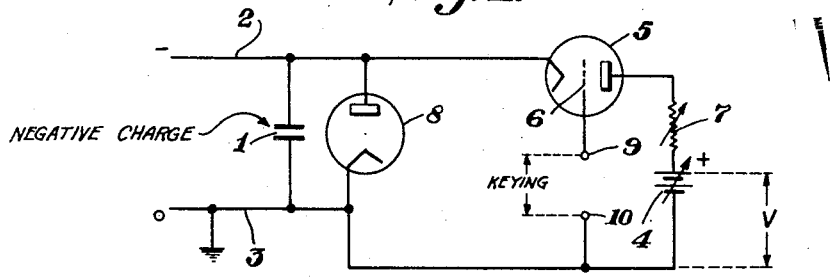
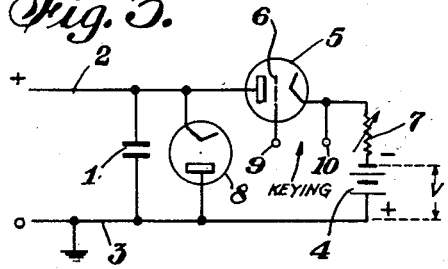
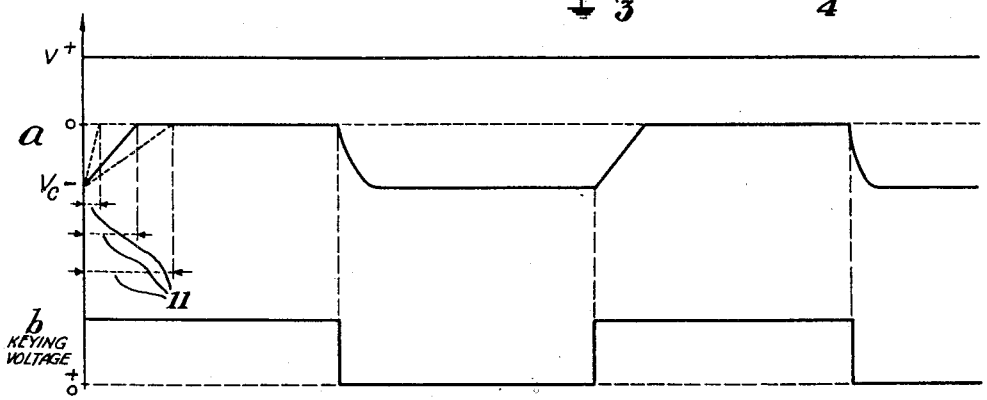
INVENTORS
SIDNEY FRANKEL
MARTIN SILVER
BY
*R. P. Morris*
ATTORNEY Patented Apr. 6, 1948

2,438,907

UNITED STATES PATENT OFFICE 2,438,907

CONDENSER DISCHARGE CONTROL CIRCUIT

Sidney Frankel, Forest Hills, and Martin Silver, New York, N. Y., assignors to Federal Telephone and Radio Corporation, New York, N. Y., a corporation of Delaware Application November 2, 1944, Serial No. 561,610

10 Claims. (Cl. 320—1)

This invention relates to keying circuits, and more particularly to improved circuits for discharging storage condensers by keying action.

It is frequently desired in various instances in electronic practice to bring about the discharge of storage condensers by electronic keying action, that is by the application of recurrent or non-recurrent voltages of relatively short duration which are effective in establishing a conductive path across the plates of a given storage condenser. This desired result which will bring about the discharge of the condenser to a given point, that is, the establishment of a given charge on the condenser, may be effected without complications when the capacitor is positively charged. Among the methods proposed, condensers thus charged, may be short circuited by means of a triode having its plate connected to the condenser input side and being rendered conductive by the application to the grid thereof of a suitable keying voltage, possibly in addition to an already existing fixed grid bias.

However, when the capacitor has been negatively charged, complications may arise, for the triode needs to be inverted with its cathode connected to the input side of the capacitor.

Under these circumstances, the fixed bias and the keying voltage on the grid of the triode will have to be critically adjusted to prevent the keying voltage from being fed to the capacitor.

It is an object of this invention to provide an improved circuit for discharging a capacitor which will overcome the difficulties adduced hereinabove, and which will maintain a given point of charge or discharge on the condenser.

It is another object to provide a discharge circuit for a condenser which is receiving a negative charge.

It is a further object to provide a discharge circuit for a capacitor which will permit the speeding up of the discharge of the capacitor.

It is still another object to provide a circuit which will nullify the negative charge on a capacitor and maintain it substantially in a neutralized condition.

In accordance with our invention, we provide for the condenser which may be negatively charged, a means for applying a charging voltage of a given positive value through a circuit element which is adapted to be rendered conductive by means of a suitable keying voltage. The charge on the capacitor may be maintained at zero or any other suitable value by providing a diode as a short circuit path thereacross which becomes and remains conductive at slightly above zero or other positive voltage on its plate, that is, as soon as the normally negative charge on the condenser reaches a predetermined value. As the keying voltage is removed or reduced beyond a given point, the charge on the condenser will again be conditioned to assume the value of any negative charge that is being applied thereto.

With suitable modifications in respect to the polarity of the various circuit elements, a similar circuit may be used when a positive charge is being applied to the capacitor, the advantage in this case being the increased speed of discharge of the capacitor, and the ability to maintain the charge thereon at a given point.

These and other features and objects of the invention will become apparent as the invention is described in further detail which is to be read in connection with the accompanying drawings, wherein:

Fig. 1 represents in schematic form a circuit in accordance with our invention;

Fig. 2 is a series of graphs illustrating the operation of the circuit of Fig. 1; and Fig. 3 is the schematic form of another circuit in accordance with our invention.

Referring to Fig. 1, a negative charge may be applied to a condenser 1 which is connected across input leads 2 and 3, where the lead 3 ordinarily may be connected to ground. A voltage source 4, by way of the plate and cathode of a triode 5 is connected to supply a positive charging voltage to the condenser when the same triode has been rendered conductive upon application of a suitable keying voltage to the grid 6 thereof. The positive charging current of the condenser 1 is in part determined by a resistance 7 in the plate circuit of triode 5. Means for short circuiting the condenser 1 may be provided in the form of a diode 8 which is connected across the condenser. The keying voltage may be applied at the terminals 9 and 10, in the grid circuit of the triode with respect to the cathode of the triode.

The operation of the circuit is as follows:

If the negative charge on the capacitor 1 is to be removed by application of a positive pulse to the grid 6 of the triode 5, the tube 5 upon application of this pulse, becomes conductive and the capacitor 1 will charge towards a positive voltage V developed by the source 4. The rate of charge of the capacitor depends on V, the value of the plate resistance 7, the capacity of the condenser 1 and the internal plate resistance of the tube 5. The value of V is determined by the extent and by how fast the charge on the capacitor is to be nullified. For the case where complete neutralization is desired, and the grid is less positive with respect to the cathode than the anode, V is of course at least as much as the negative potential due to the capacitor charge. As soon as the negative charge and also the potential of the capacitor has reached a point slightly above zero, the diode 8 becomes conductive and is effective thenceforth until the keying pulse on the grid 6 is removed, in holding the potential of the condenser 1 substantially at zero value by serving as a very low impedance circuit thereacross. By suitably biasing the diode, other operating points for the diode or its equivalent, may be attained.

In Fig. 2, graph $a$ represents the voltage relations with respect to time of the voltage V of the source 4 which is constant throughout, and of the potential, $V_c$, of the condenser 1 which, in the case illustrated, has initially a negative value. In graph $b$, the variation of the keying voltage as applied to the grid 6 is illustrated. The keying voltage remains positive for a given length of time and is then reduced to zero periodically. Depending on the actual positive value of the voltage V and on the plate resistance 7, both of which may be variable, the time of nullification of the negative charge on the condenser, that is until the charge thereon is reduced to zero, is shown in graph $a$ to have various possible values as at 11. The time for the condenser again to assume a fully negative charge, however, is a constant one, the rate of change being exponential for charge as well as discharge.

Without attempting to express the relationship in mathematical terms, it will be seen that the potential across the capacitor, at any one time is a function of its initial value, the value of the applied potential of the source 4, the point in time after its initial application, and of the values of the circuit resistance and the capacity of the capacitor 1.

Assuming that the values of the capacity and of the initial capacitor potential have been predetermined by other considerations, it may be seen that the period of discharge is controlled by the values of the circuit resistance and of the potential at 4. Although the circuit resistance cannot be made to approach zero because it is at least as large as the tube plate resistor, the period of discharge may be made to approach zero, however, by increasing V, that is the potential of source 4. As a matter of fact, when $$\frac{V_c}{V} \ll 1$$

(where $V_c$=the capacitor potential) the period of discharge is approximately directly proportional to the circuit resistance, the capacity, and to $V_c$, and inversely proportional to the potential V.

It is thus apparent that the negative potential across the condenser 1 may be removed or reduced to substantially zero in a period of time which may be regulated by suitable adjustment of the voltage obtainable from the source 4. It is also apparent that the circuit proposed hereinabove is effective not only in speeding up the nullification of any negative charge on the capacitor and in maintaining the condenser substantially discharged but is also effective in preventing the complications touched upon in the beginning of the description by separating the circuits of the condenser and of the source of the keying voltage.

In Fig. 3, there is illustrated the circuit of Fig. 1, when modified to handle a positive charge on the capacitor 1. It will be seen that the circuit is essentially the same except that the diode 8 and the triode 6 have had their relative polarity reversed, while the source of potential 4 is now connected to supply a negative potential 4 in opposition to the positive charge on the capacitor 1.

Although we have shown and described a specific apparatus for carrying out our invention, it will be understood that the form herein shown and described is to be regarded as illustrative of the invention only and not in limiting the objects thereof or the appended claims.

We claim:

1. A circuit for effecting the discharge of a storage capacitor charged to a potential of a given polarity, comprising voltage means for supplying a potential to said capacitor in opposition to the charge thereon, normally blocked coupling means connecting said voltage means to said capacitor, means responsive to a keying potential for unblocking said coupling means whereby the potential of said voltage means charges said capacitor to a given point, and means for maintaining said capacitor charged to said given point by providing a low impedance path across said capacitor, said last named means being rendered operative when the capacitor has been charged to said given point.

2. A circuit in accordance with claim 1, wherein said means for connecting comprises a triode and a resistance in its plate circuit, and said responsive means comprises the grid of said triode.

3. A circuit in accordance with claim 1, wherein said means providing a low impedance path comprises a diode across said capacitor.

4. A circuit in accordance with claim 1, wherein said voltage means is variable in respect to its potential, whereby the period of discharge of the said capacitor may be made variable.

5. A circuit for effecting the discharge of a negatively charged storage condenser by means of a keying potential, comprising a voltage source for providing a positive potential for charging said capacitor to substantially nullify said negative charge, a triode for coupling said source to said capacitor having its cathode connected to the capacitor, a resistor in the circuit between said source and the plate of said triode, means for applying a keying potential in the grid circuit of the triode, and a diode arranged across said capacitor having its anode connected to the input side of the said capacitor.

6. A circuit for nullifying the negative charge on a negatively charged storage capacitor, comprising a voltage source for providing a relatively high positive potential for charging said capacitor in opposition to said negative charge, normally blocked coupling means for connecting said source to said capacitor, means responsive to a keying potential for unblocking said coupling means, and means to prevent charging the capacitor positively.

7. A circuit for nullifying the negative charge on a negatively charged storage capacitor and maintaining it in a substantially neutralized condition, comprising a voltage source for providing a relatively high positive potential for charging said capacitor in opposition to said negative charge, a triode normally blocked responsive to a keying potential to its grid to connect said source to said capacitor, and means responsive to at least a substantially net zero potential across said capacitor for providing a discharge path across said capacitor.

8. A circuit for effecting the discharge of a positively charged storage condenser by means of a keying potential, comprising a voltage source for providing a negative potential for discharging said capacitor to substantially nullify said positive charge, a triode for coupling said source to said capacitor having its anode connected to the capacitor, a resistor in circuit between said source and the cathode of said triode, means for applying a keying potential in the grid circuit of the triode, and a diode arranged across said capacitor having its cathode connected to the input side of the said capacitor.

9. A method for discharging in substantially zero time a capacitor charged to a given potential by means of a keying voltage, comprising effecting the application of a potential to said capacitor having a polarity opposite to that of the capacitor by means of the keying voltage, the value of said potential being chosen to result in the ratio of $$\frac{V_c}{V} \ll 1$$

where $V_c$ is the original potential across the capacitor, and $V$ is the potential, and preventing the recharging of the capacitor to a polarity opposite the original potential.

10. A circuit for substantially nullifying the positive charge on a positively charged storage capacitor and maintaining it in a substantially neutralized condition, comprising a voltage source for providing a relatively large negative potential for charging said capacitor in opposition to said positive charge, a triode normally blocked responsive to a keying potential to its grid to connect said source to said capacitor, and means responsive to at least a substantially net zero potential across said capacitor for providing a discharge path across said capacitor.

SIDNEY FRANKEL.
MARTIN SILVER.

REFERENCES CITED

The following references are of record in the file of this patent:

UNITED STATES PATENTS

| Number | Name | Date |
| --- | --- | --- |
| 2,235,385 | Rava | Mar. 18, 1941 |
| 2,250,102 | Klemperer | July 22, 1941 |
| 2,278,430 | Dawson | Apr. 7, 1942 |
| 2,306,230 | Somerville | Dec. 22, 1942 |
| 2,354,768 | Nokes | Aug. 1, 1944 |